United States Patent
Shveidel

(10) Patent No.: US 10,331,498 B1
(45) Date of Patent: Jun. 25, 2019

(54) COLOREDLOCK SYNCHRONIZATION OBJECT, ALLOWING FLOW SPECIFIC POLICY OF LOCK CANCELING

(71) Applicant: EMC IP Holding Company LLC, Hopkinton, MA (US)

(72) Inventor: Vladimir Shveidel, Pardes-Hana (IL)

(73) Assignee: EMC IP Holding Company LLC, Hopkinton, MA (US)

( * ) Notice: Subject to any disclaimer, the term of this patent is extended or adjusted under 35 U.S.C. 154(b) by 85 days.

(21) Appl. No.: 15/497,477

(22) Filed: Apr. 26, 2017

(51) Int. Cl.
    *G06F 9/52* (2006.01)

(52) U.S. Cl.
    CPC ............. *G06F 9/524* (2013.01); *G06F 9/526* (2013.01); *G06F 2209/521* (2013.01); *Y10S 707/99938* (2013.01)

(58) Field of Classification Search
    None
    See application file for complete search history.

(56) References Cited

U.S. PATENT DOCUMENTS

| | | | | |
|---|---|---|---|---|
| 6,715,146 B1 * | 3/2004 | Simmons | ................ | G06F 9/524 707/999.008 |
| 6,938,131 B2 * | 8/2005 | Ogasawara | ............ | G06F 9/3834 711/151 |
| 7,222,142 B2 * | 5/2007 | Fischer | ............. | G06F 17/30067 707/661 |
| 7,386,864 B2 * | 6/2008 | Richardson | ............. | G06F 9/526 717/116 |
| 8,352,870 B2 * | 1/2013 | Bailor | ................... | G06F 16/954 715/751 |
| 8,463,911 B2 * | 6/2013 | Sasaoka | .................. | G06F 9/526 709/226 |
| 8,539,486 B2 * | 9/2013 | Cain, III | ................. | G06F 9/528 711/147 |
| 8,566,298 B1 * | 10/2013 | Nagaralu | ................ | G06F 9/526 707/704 |
| 8,701,111 B2 * | 4/2014 | Fontenot | ................. | G06F 9/526 718/100 |
| 8,972,994 B2 * | 3/2015 | Srinivas | .............. | G06F 9/45516 707/999.008 |
| 9,280,396 B2 * | 3/2016 | Thoppai | ..................... | G06F 9/52 |
| 9,471,400 B1 * | 10/2016 | Greco | ..................... | G06F 9/528 |
| 10,049,127 B1 * | 8/2018 | Shavit | ............... | G06F 17/30362 |
| 2004/0148475 A1 * | 7/2004 | Ogasawara | ........... | G06F 9/3834 711/151 |
| 2008/0155546 A1 * | 6/2008 | Ruemmler | .............. | G06F 9/526 718/102 |
| 2009/0063783 A1 * | 3/2009 | von Praun | ............ | G06F 12/084 711/147 |
| 2011/0209130 A1 * | 8/2011 | Burka | ..................... | G06F 9/445 717/166 |

(Continued)

*Primary Examiner* — Abu Zar Ghaffari
(74) *Attorney, Agent, or Firm* — Daly, Crowley Mofford & Durkee, LLP

(57) ABSTRACT

Aspects for operating a computer system include a colored lock synchronization object allowing flow specific policy of lock canceling. An extended lock object Application Programming Interface (API) including a color attribute is utilized. A color attribute is passed to the extended lock API, whereby the color attribute reflects a type of flow or thread that called a colored lock object. Selective termination of requests waiting on a colored lock object can be utilized to prevent a potential deadlock condition.

16 Claims, 4 Drawing Sheets

(56) References Cited

U.S. PATENT DOCUMENTS

| | | | |
|---|---|---|---|
| 2011/0225113 A1* | 9/2011 | Mann | G06F 9/52 706/47 |
| 2014/0040519 A1* | 2/2014 | Ur | G06F 9/524 710/200 |
| 2015/0248452 A1* | 9/2015 | Dillenberger | G06F 17/30362 707/607 |
| 2015/0269008 A1* | 9/2015 | Moir | G06F 9/466 711/152 |

\* cited by examiner

COLOREDLOCK SYNCHRONIZATION OBJECT, ALLOWING FLOW SPECIFIC POLICY OF LOCK CANCELING

BACKGROUND

A storage system such as a storage cluster may perform a high availability procedure upon detection of a failure within the system. The storage cluster may perform one or more of the following procedures. The storage cluster may reconfigure itself, may redistribute responsibilities between live components/modules, may perform required clean-ups, as well as other related processing. After completion of the high availability procedures, the cluster may continue with IO processing in degraded or normal mode, depending on type of failure that triggered the high availability procedure.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

A computer storage system may utilize different types of flows/threads including the same resources and, therefore, access the same synchronization objects (e.g., locks) protecting those resources. The management of the different types of flows becomes more difficult when locks are involved. A lock may include a synchronization mechanism for enforcing limits on access to a resource in an environment where there are many threads of execution. Generally, each thread may cooperate by acquiring the lock before accessing the corresponding data. Locks may block the execution of the thread requesting the lock until it is allowed to access the locked resource. The use of locks can sometimes result in deadlock or livelock condition. A deadlock condition may occur when two flows sharing the same resource are effectively preventing each other from accessing the resource, resulting in both flows ceasing to function. A livelock condition may be similar to a deadlock, except that the states of the flows involved in the livelock constantly change with regard to one another, with neither one progressing.

There may exist a danger of a deadlock condition occurring during a high availability procedure. As an example of a deadlock condition, if a destager thread is waiting for some resource on the resource-related lock object, then an IO thread requests the same lock object and therefore is queued in the waiting queue of this lock. If some module has failed and the high availability procedure has started, the destager thread may wait on the resource related lock and may hold it until the high availability procedure completes. The IO thread may be continuously waiting on the lock and consequently may not be aborted or completed. At the same time, the high availability procedure may not be continued because of IO flows that are still active in the system and the cluster cannot complete the execution of the suspend command. The result may be a deadlock scenario. The high availability procedure may not be completed because of IO in progress that is waiting on a lock and doesn't exit, while the destager flow may not free the lock as the destager flow is waiting for the completion of the high availability procedure.

To avoid the deadlock scenario described above the following approach may be used. A thread, before entering the waiting for the high availability procedure completion state, may free the locks it holds. After high availability procedure completion, the thread may be woken up and may retake the locks again. This approach may be complicated because there is a need to track the held locks across the thread call stacks.

One aspect of the presently described coloredlock synchronization object allowing flow specific policy of lock canceling provides a method including using an extended lock object Application Programming Interface (API) that includes a color attribute reflecting a type of flow or thread that called a colored lock object. Selective termination of requests waiting on a colored lock object may now be used to prevent a deadlock condition.

BRIEF DESCRIPTION OF THE DRAWING FIGURES

Objects, aspects, features, and advantages of embodiments disclosed herein will become more fully apparent from the following detailed description, the appended claims, and the accompanying drawings in which like reference numerals identify similar or identical elements. Reference numerals that are introduced in the specification in association with a drawing figure may be repeated in one or more subsequent figures without additional description in the specification in order to provide context for other features. For clarity, not every element may be labeled in every figure. The drawings are not necessarily to scale, emphasis instead being placed upon illustrating embodiments, principles, and concepts. The drawings are not meant to limit the scope of the claims included herewith.

DETAILED DESCRIPTION

Figure 1:
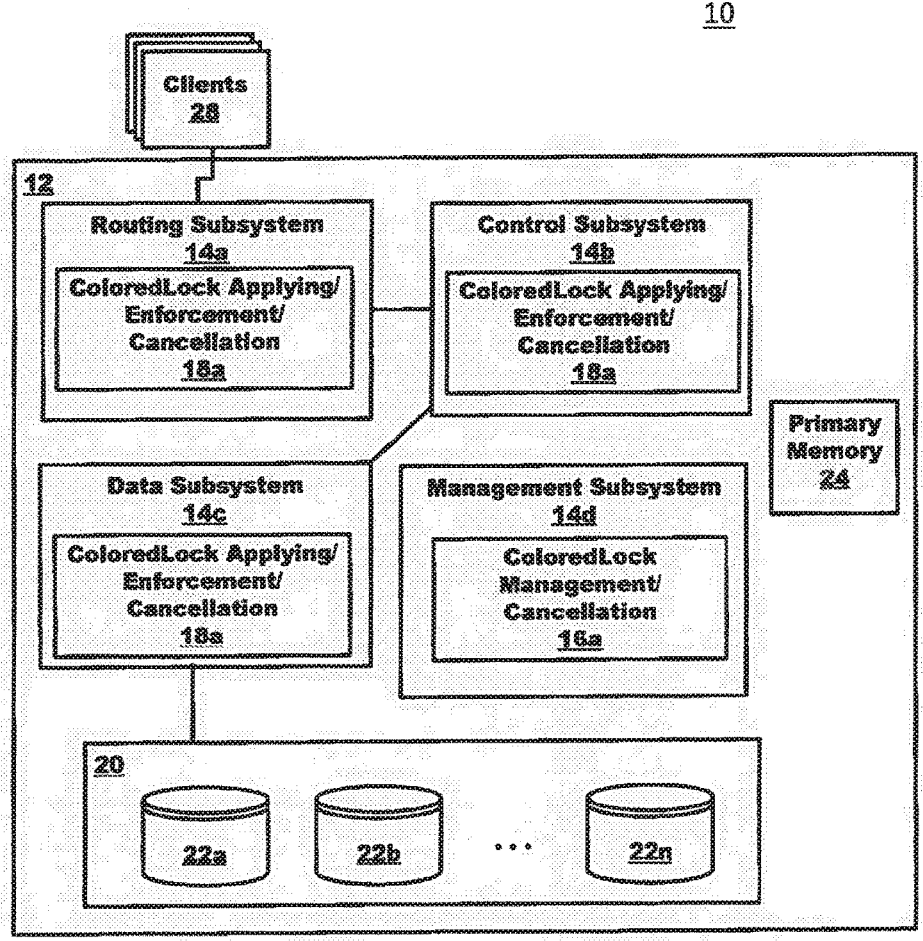
FIG. 1 is a block diagram of a computer system utilizing a coloredlock synchronization object allowing flow specific policy of lock canceling, in accordance with illustrative embodiments.

Before describing embodiments of the concepts, structures, and techniques sought to be protected herein, some terms are explained. In some embodiments, the term "I/O request" or simply "I/O" may be used to refer to an input or output request (e.g., a data read or data write request). The term "storage system" may encompass physical computing systems, cloud or virtual computing systems, or a combination thereof. The term "storage device" may refer to any non-volatile memory (NVM) device, including hard disk drives (HDDs), solid state drivers (SSDs), flash devices (e.g., NAND flash devices), and similar devices that may be accessed locally and/or remotely (e.g., via a storage attached network (SAN)). The term "storage device" may also refer to a storage array including multiple storage devices. The term "Application Programming Interface" or simply "API" define a set of routines, protocols, and tools that specify how software components should interact. The term "pseudocode" uses the structural conventions of a normal programming language, but is intended for human reading rather than machine reading. Pseudocode typically omits details that are essential for machine understanding of the algorithm, such as variable declarations, system-specific code and some subroutines. The programming language is augmented with natural language description details, where convenient, or with compact mathematical notation. The purpose of using pseudocode is that it is easier for people to understand than conventional programming language code, and that it is an efficient and environment-independent description of the key principles of an algorithm.

Since a high availability procedure may include redistribution of responsibilities between modules, one step of such a procedure may be a temporary suspension of the involved modules, initiated by a suspend command. The suspend command may require that flows which are dependent on the cluster configuration, should be either completed, aborted or suspended in a safe state. The suspended flows may reach a suspension point outside of a critical section and wait there for the completion of the high availability procedure, which is indicated by a resume command being sent to the modules. A flow may also be unaffected by the high availability procedure. Such flows are unaffected by the suspend command, as the flows either continue execution as usual if the flow doesn't depend on the failed component or otherwise wait for high availability procedure completion.

Whether the flow should be completed, aborted, suspended or unaffected depends on the flow type and on type of the high availability procedure (e.g. a failover, a failback, or a restart. For example, an IO flow is usually either completed if it doesn't depend on the failed component or aborted if it faces errors caused by the failed component. A background flow (for example a volume deleting flow) is either aborted or suspended, depending on required high availability procedure.

Moreover, a background flow may be first suspended and then, while it is waiting for the resume command to continue processing, an abort command could be requested, due to additional cluster degradation and correspondent change of the required high availability type. Journal destager threads may not be aborted or suspended, so these destager threads are unaffected by the suspend command. In any case, on receiving a suspend command, threads may either exit or reach a synchronization object where they will wait for the completion of the high availability procedure resulting in either a resume command, or an error clearance.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

Referring now to FIG. 1 a block diagram of an example storage system environment 10 according to an illustrative embodiment of the disclosure is shown. The storage system environment 10 may include a storage system 12 which may include a plurality of subsystems 14a-14d (generally denoted 14 herein), a storage array 20 comprising a plurality of storage devices 22a . . . 22n (generally denoted 22 herein), and a primary memory 24. In some embodiments, the storage devices 22 may be provided as random access storage devices, such as solid-state devices (SSDs).

The primary memory 24 can be any type of memory having access times that are significantly faster compared to the storage devices 20. In some embodiments, primary memory 24 may be provided as dynamic random-access memory (DRAM). In certain embodiments, primary memory 24 may be provided as synchronous DRAM (SDRAM). In one embodiment, primary memory 24 may be provided as double data rate SDRAM (DDR SDRAM), such as DDR3 SDRAM.

In the embodiment shown, the subsystems 14 may include a routing subsystem 14a, a control subsystem 14b, a data subsystem 14c, and a management subsystem 14d. Subsystems 14a, 14b and 14c may include a coloredlock applying/enforcement/cancellation element 18a. Subsystem 14d may include a coloredlock management/cancellation element 16a. In one embodiment, subsystems 14 may be provided as software components, i.e., computer program code that, when executed on a processor, may cause a computer to perform functionality described herein. In a certain embodiment, the storage system 12 includes an operating system (OS) and one or more of the subsystems 14 may be provided as user space processes executable by the OS. In other embodiments, the subsystems 14 may be provided, at least in part, as hardware, such as digital signal processor (DSP) or an application specific integrated circuit (ASIC) configured to perform functionality described herein.

The routing subsystem 14a may be configured to receive I/O operations from clients 28 using, for example, an external application-programming interface (API) and to translate client I/O operations into internal commands. In some embodiments, the routing subsystem 14a is configured to receive commands from small computer system interface (SCSI) clients 28. In some embodiments subsystem 14a may include a coloredlock applying/enforcement/cancellation element 18a, used for synchronization. The control subsystem 14b may be configured to maintain a mapping between I/O addresses associated with data and the corresponding chunk hashes. Control subsystem 14b may also include a coloredlock applying/enforcement/cancellation element 18a, used for synchronization.

The data subsystem 14c may be configured to maintain a mapping between chunk hashes and physical storage addresses (i.e., storage locations within the storage array 20 and/or within individual storage devices 22. The data subsystem 14c may be also be configured to read and write data from/to the storage array 20 (and/or to individual storage devices 22 therein). Data subsystem 14c may also include a coloredlock applying/enforcement/cancellation element 18a, used for synchronization.

The management subsystem 14d may be configured to monitor and track the status of various hardware and software resources within the storage system 12. In some embodiments, the management subsystem 14d may manage the allocation of memory by other subsystems (e.g., subsystems 14a-14c). In some embodiments, the management subsystem 14d can also be configured to monitor other subsystems 14 (e.g., subsystems 14a-14c) and to use this information to determine when the storage system 12 may begin processing client I/O operations. Management subsystem 14d may include a coloredlock selective management/cancellation element 16a, which may apply an extended lock object API including a color attribute which can be used to prevent a deadlock condition. A subsystem 14 may store various types of information within primary memory 24. In some embodiments, subsystems cache metadata within primary memory 24 to improve system performance. In some embodiments, a subsystem 14 may maintain change journal to efficiently handle changes to metadata or other information. Such change journals may also be stored in primary memory 24.

In order to solve the earlier described deadlock problem, a ColoredLock threads synchronization object that provides flow-dependent behavior replaces regular lock objects. The following description includes example pseudocode for the object. The ColoredLock object/class is an extension of the regular lock object/class. A Regular lock class provides the following API/methods.

A lock object Lock(LOCK_object) may be used to obtain exclusive or non-exclusive ownership of a LOCK_object. An unlock object UnLock(LOCK_object) may be used to release the LOCK_object. It is noted that the conventional lock and unlock APIs do not return a result.

The LOCK_object includes an atomic object that provides Atomic_Test_and_Set operation used by the locking mechanism. When a thread performs an atomic operation, the other threads see it as happening instantaneously. The advantage of atomic operations is that they may occur relatively quickly compared to locks, and may not suffer from deadlock. A waiting queue is used, where threads waiting for the LOCK_object freeing are queued. Each entry of the Waiting Queue (WaitingQueueEntry) contains a reference to the corresponding waiting thread.

A ColoredLock API extends the regular lock API. A new attribute Color which refers to a flow type is defined for each waiting queue entry. The extended ColoredLock's API includes a Lock(ColoredLock_object, Color) call, an UnLock(ColoredLock_object) call, a CancelLockByColor (ColoredLock_object, Colors_mask) call, and a clearColor-Mask(ColoredLock_object) call.

In the Lock (ColoredLock_object, Color) API, the additional parameter Color is passed to the extended Lock( ) API. This parameter reflects the type of flow/thread that called Lock( ). This attribute may be ignored if the Colored-Lock_object is free and the Lock( ) could be completed immediately. However, if the object is already locked (occupied), then the caller thread may be queued in the waiting queue of the ColoredLock_object with the Color attribute. The extended Lock(ColoredLock_object, Color) API may return the following results: LOCK_GOT_RESULT if lock is obtained, ABORTED_RESULT if waiting in the queue was canceled by CancelLockByColor( ) API.

The CancelLockByColor (ColoredLock_object, Colors_mask) API results in the following results. Any new attempt to get Lock ( ) with the Color matching Colors_mask will be immediately rejected with ABORTED_RESULT result. The ColoredLock_object WaitingQueue is scanned. Each entry that has the attribute Color matching Colors_mask parameter is removed from the waiting queue and the corresponding (i.e. called by this thread) Lock( ) returns with ABORTED_RESULT result. In this manner, the CancelLockByColor( ) allows selective termination of requests waiting on ColoredLock_object and deadlock conditions may be avoided.

The ClearColorMask (ColoredLock_object, Colors_mask) API clears Colors_mask defined by previous CancelLockByColor( ) and therefore may allow regular operation of Lock( ): i.e. any thread requesting the lock will be queued in the Waiting Queue of ColoredLock_object if the lock is already occupied.

In some embodiments the CancelLockByColor( ) and ClearColorMask( ) APIs may be defined for more extended scope: i.e. for a group of ColoredLock_objects instead of a single ColoredLock_object. In this case the logic described in CancelLockByColor( ) and ClearColorMask( ) APIs is applied to each ColoredLock_object related to the group.

As described above, the deadlock-free cluster suspend/resume mechanism based on selective cancellation ability of ColoredLocks may be used for protection of the cluster resources instead of regular locks. Each thread may send its flow type (color) to the Lock( ) API when requesting a lock.

High availability flows (including the suspend command) calls CancelLockByColor( ) API with Colors_mask corresponding to the thread/flow types that should be completed or aborted as a result of suspend command i.e. before the high availability flow could continue (for example background threads and IO threads). The CancelLockByColor( ) API may be called for ColoredLock_objects that could potentially block thread/flow that should be completed or terminated. These objects may be grouped in specific lock pools, so in practice CancelLockByColor( ) is called once for the pool as a whole.

The CancelLockByColor( ) call prevents any new Lock( ) (i.e. Lock( ) that come after CancelLockByColor( ) was issued) of specified color entering the waiting state. The CancelLockByColor( ) call also forces threads/flows of specified color to cancel their waiting on the ColoredLock_objects and to reach either an exit point or some other safe point. Consequently, the high availability process can continue up to its completion.

By use of the ColoredLock object/class, some threads that may be completed or terminated before high availability flow could continue are not blocked on a lock and reach either their exit point or some other safe point. This permits the module to be suspended and the high availability process to continue and be completed, while the other unaffected thread types continue working regularly.

When the high availability procedure is completed and cluster operation should be resumed, ClearColorMask( ) API is called for ColoredLock_objects (or for Lock pool, if Locks are grouped in the pool). This clears the Colors_mask, and since this moment the regular behavior of Lock( ) API is restored, specifically any thread (of any color) requesting the Lock that is already occupied will be blocked until the Lock is freed.

The ColoredLock_object description is generic and can be applied to any type of synchronization objects independently of their semantics (examples are regular Lock, ReadWriteLock, Barrier, Event etc.). Any type of synchronization objects that includes WaitingQueue can be modified to become flow-dependent (colored) following the described technique.

The processes described herein are not limited to the specific embodiments described. For example, the processes are not limited to the specific processing order shown in FIGS. 2A to 2B. Rather, any of the blocks of the processes may be re-ordered, combined or removed, performed in parallel or in serial, as necessary, to achieve the results set forth herein.

Figure 2A:
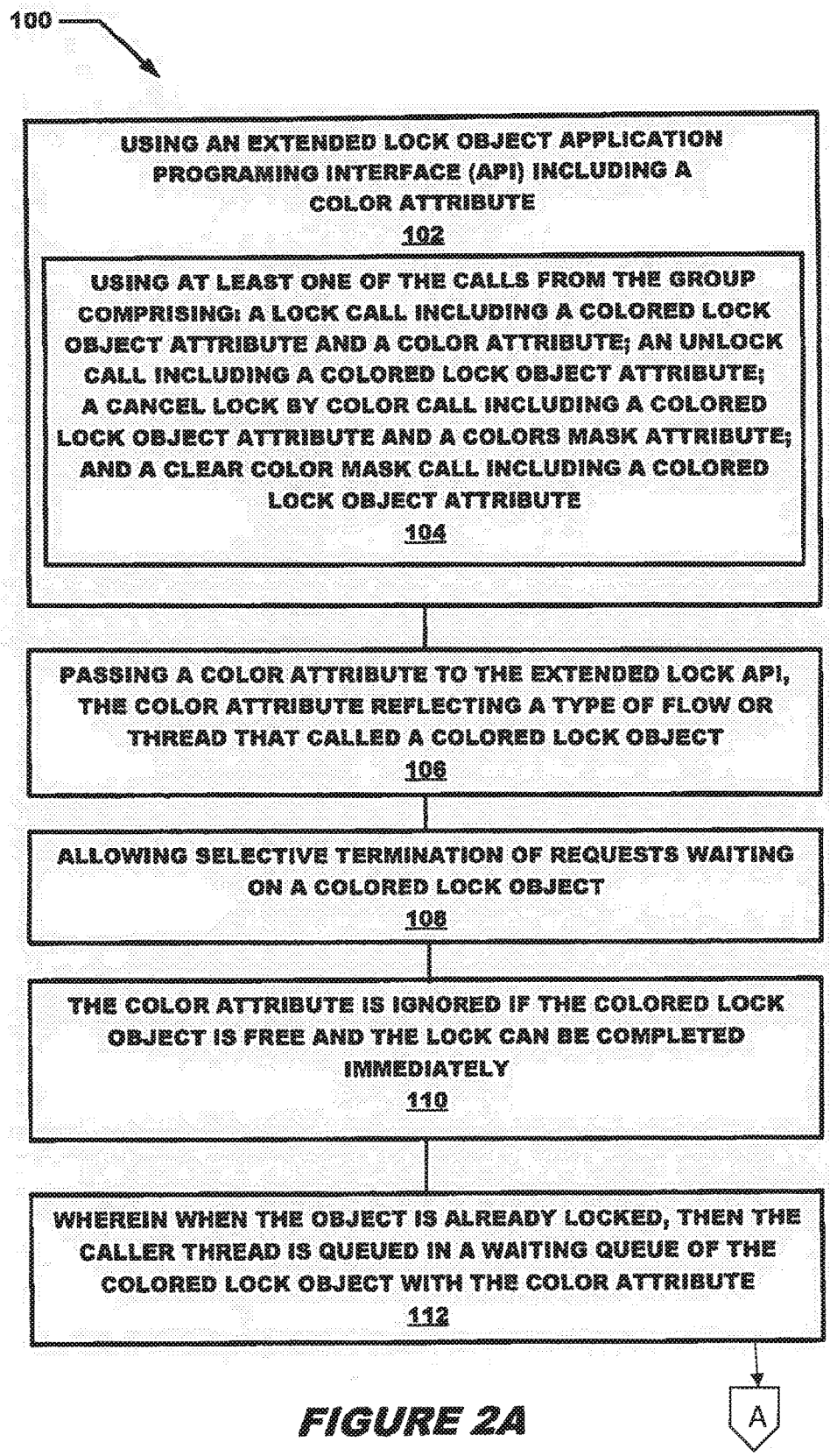
FIGS. 2A to 2B are a flowchart of an illustrative process utilizing a coloredlock synchronization object allowing a flow specific policy of lock canceling, in accordance with illustrative embodiments.
Figure 2B:
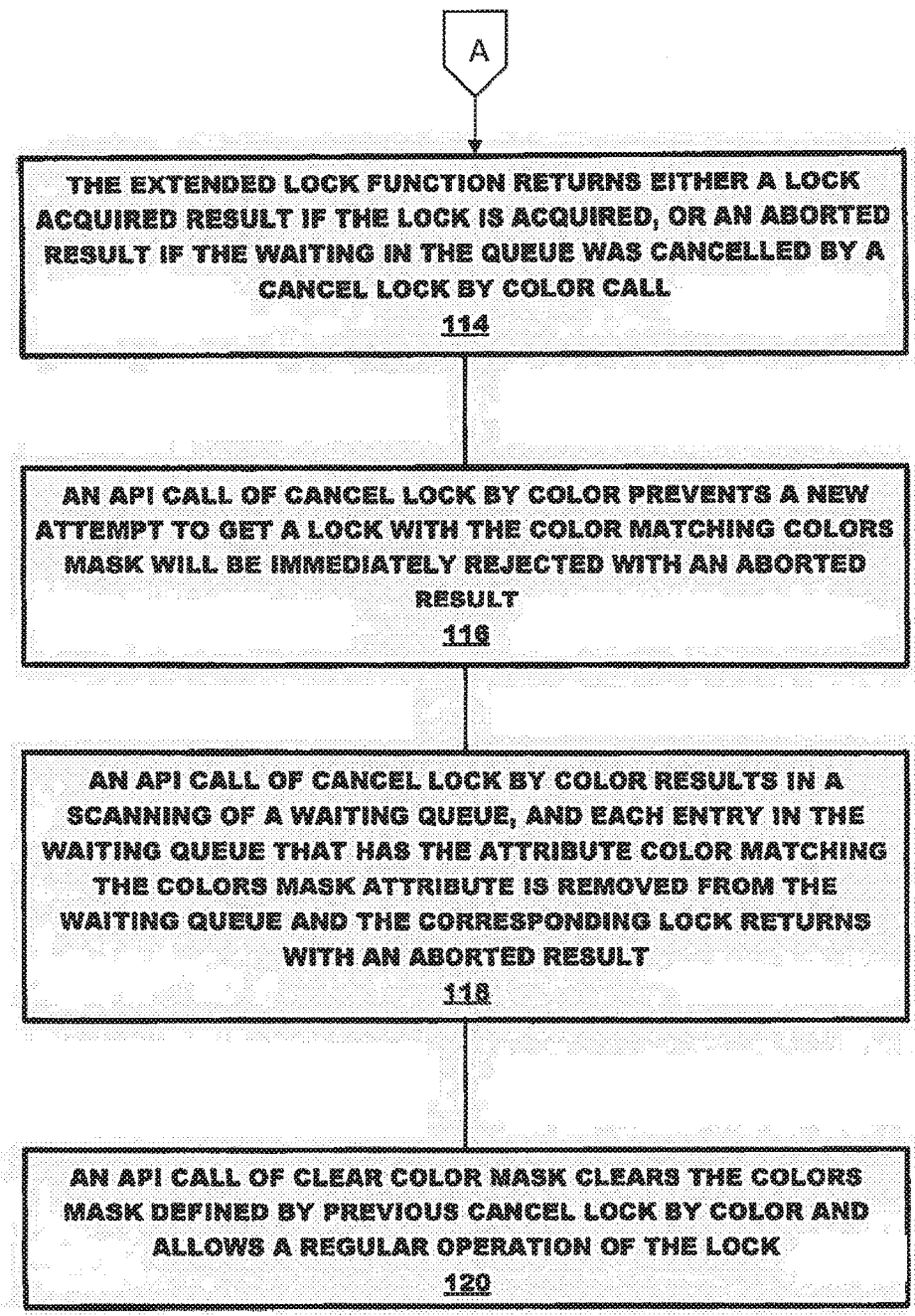

Referring now to FIGS. 2A to 2B, an illustrative process 100 for performing a flow specific policy of lock canceling 100 is shown. The method starts with processing block 102 which discloses using an extended lock object Application Programming Interface (API) including a color attribute. As shown in processing block 104, in some embodiments using an extended lock API includes using at least one of the calls from the group comprising a lock call including a colored lock object attribute and a color attribute; an unlock call including a colored lock object attribute; a cancel lock by color call including a colored lock object attribute and a colors mask attribute; and a clear color mask call including a colored lock object attribute.

Processing block 106 shows passing a color attribute to the extended lock API, the color attribute reflecting a type of flow or thread that called a colored lock object. Each type of flow has a respective color, adding a level of granularity which in turn permits selective aborting of calls by color to avoid a potential deadlock situation.

Processing block 108 recites allowing selective termination of requests waiting on a colored lock object. The termination is by color type, and allows selective termination on a flow-type basis.

Processing block 110 discloses wherein the color attribute is ignored if the colored lock object is free and the lock can be completed immediately. Since the object is available, the color attribute can be ignored. As shown in processing block 112 when the object is already locked, then the caller thread is queued in a waiting queue of the colored lock object with the color attribute.

Processing continues with processing block 114 as shown in FIG. 2B. Processing block 114 discloses wherein the extended lock function returns either a lock acquired result if the lock is acquired, or an aborted result if the waiting in the queue was cancelled by a cancel lock by color call.

Processing block 116 shows wherein an API call of cancel lock by color prevents a new attempt to get a lock with the color matching colors mask will be immediately rejected with an aborted result. As shown in processing block 118 an API call of cancel lock by color results in a scanning of a waiting queue, and each entry in the waiting queue that has the attribute color matching the colors mask attribute is removed from the waiting queue and the corresponding lock returns with an aborted result.

Processing block 120 recites an API call of clear color mask clears the colors mask defined by previous cancel lock by color and allows a regular operation of the lock.

Figure 3:
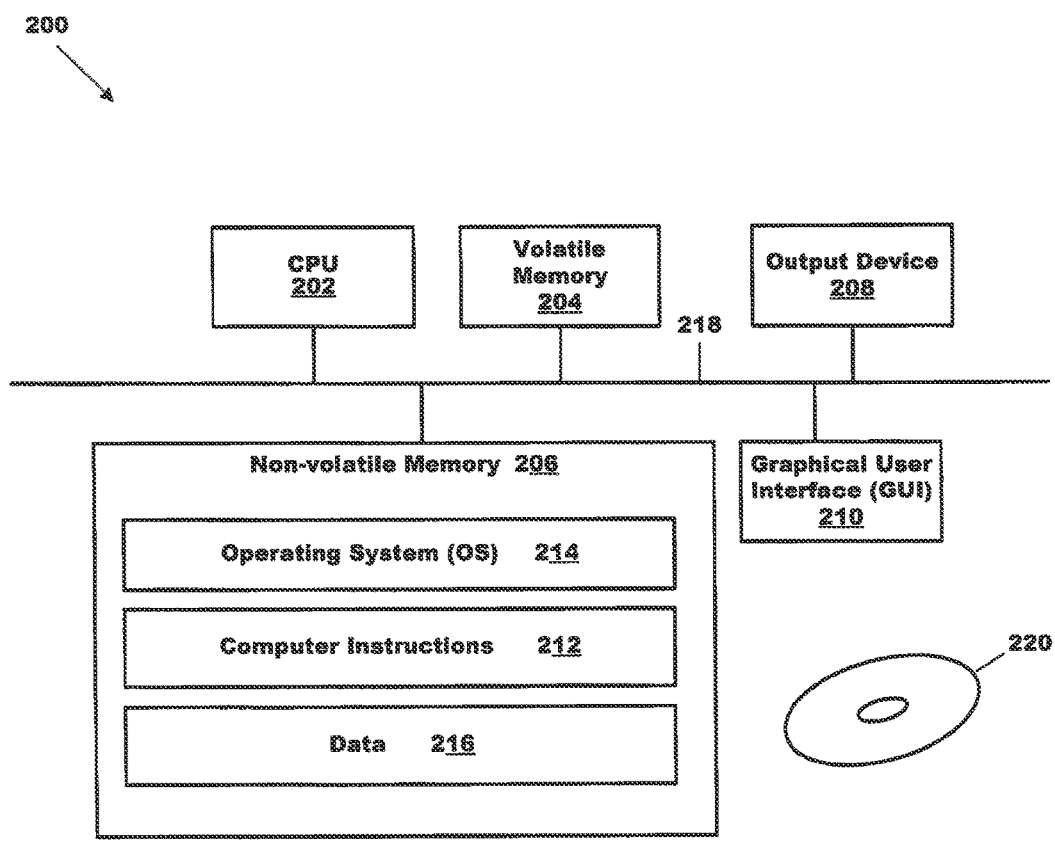
FIG. 3 is a block diagram of an example of a hardware device that may perform at least a portion of the processes in FIGS. 2A to 2B.

Referring now to FIG. 3, in some described embodiments, storage system 12 of FIG. 1 may include one computer, a plurality of computers, or a network of distributed computers. For example, in some embodiments, the computers may be implemented as one or more computers such as shown in FIG. 3. As shown in FIG. 3, computer 200 may include processor 202, volatile memory 204 (e.g., RAM), non-volatile memory 206 (e.g., one or more hard disk drives (HDDs), one or more solid state drives (SSDs) such as a flash drive, one or more hybrid magnetic and solid state drives, and/or one or more virtual storage volumes, such as a cloud storage, or a combination of physical storage volumes and virtual storage volumes), graphical user interface (GUI) 210 (e.g., a touchscreen, a display, and so forth) and output device 208 (e.g., a mouse, a keyboard, etc.). Non-volatile memory 206 stores computer instructions 212, an operating system 214 and data 216 such that, for example, the computer instructions 212 are executed by the processor 202 out of volatile memory 204 to perform at least a portion of the processes described herein. Program code may be applied to data entered using an input device of GUI 210 or received from I/O device 220.

Processor 202 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a microcontroller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

The processes described herein are not limited to use with the hardware and software of FIG. 3 and may find applicability in any computing or processing environment and with any type of machine or set of machines that may be capable of running a computer program. The processes described herein may be implemented in hardware, software, or a combination of the two.

Processor 202 may be implemented by one or more programmable processors executing one or more computer programs to perform the functions of the system. As used herein, the term "processor" describes an electronic circuit that performs a function, an operation, or a sequence of operations. The function, operation, or sequence of operations may be hard coded into the electronic circuit or soft coded by way of instructions held in a memory device. A "processor" may perform the function, operation, or sequence of operations using digital values or using analog signals. In some embodiments, the "processor" can be embodied in one or more application specific integrated circuits (ASICs). In some embodiments, the "processor" may be embodied in one or more microprocessors with associated program memory. In some embodiments, the "processor" may be embodied in one or more discrete electronic circuits. The "processor" may be analog, digital or mixed-signal. In some embodiments, the "processor" may be one or more physical processors or one or more "virtual" (e.g., remotely located or "cloud") processors.

Various functions of circuit elements may also be implemented as processing blocks in a software program. Such software may be employed in, for example, one or more digital signal processors, microcontrollers, or general purpose computers. Described embodiments may be implemented in hardware, a combination of hardware and software, software, or software in execution by one or more physical or virtual processors.

Some embodiments may be implemented in the form of methods and apparatuses for practicing those methods. Described embodiments may also be implemented in the form of program code, for example, stored in a storage medium, loaded into and/or executed by a machine, or transmitted over some transmission medium or carrier, such as over electrical wiring or cabling, through fiber optics, or via electromagnetic radiation. A non-transitory machine-readable medium may include but is not limited to tangible media, such as magnetic recording media including hard drives, floppy diskettes, and magnetic tape media, optical recording media including compact discs (CDs) and digital versatile discs (DVDs), solid state memory such as flash memory, hybrid magnetic and solid state memory, non-volatile memory, volatile memory, and so forth, but does not include a transitory signal per se. When embodied in a non-transitory machine-readable medium and the program code is loaded into and executed by a machine, such as a computer, the machine becomes an apparatus for practicing the method.

When implemented on one or more processing devices, the program code segments combine with the processor to provide a unique device that operates analogously to specific logic circuits. Such processing devices may include, for example, a general-purpose microprocessor, a digital signal processor (DSP), a reduced instruction set computer (RISC), a complex instruction set computer (CISC), an application specific integrated circuit (ASIC), a field programmable gate array (FPGA), a programmable logic array (PLA), a micro-controller, an embedded controller, a multi-core processor, and/or others, including combinations of one or more of the above. Described embodiments may also be implemented in the form of a bitstream or other sequence of signal values electrically or optically transmitted through a medium, stored magnetic-field variations in a magnetic recording medium, etc., generated using a method and/or an apparatus as recited in the claims.

Various elements, which are described in the context of a single embodiment, may also be provided separately or in any suitable subcombination. It will be further understood that various changes in the details, materials, and arrangements of the parts that have been described and illustrated herein may be made by those skilled in the art without departing from the scope of the following claims.

I claim:

1. A method of allowing a flow specific policy of lock canceling, the method comprising:

receiving a request for a lock object, the request received at a storage system from a calling thread, the request including a color attribute that indicates a type of flow associated with the calling thread;

passing the request with the color attribute to an extended lock object application programming interface (API) at the storage system; and performing, at the storage system, selective termination of requests that are waiting on the lock object, the selective termination based on the color attribute, and the requests including the request for the lock object;

wherein the extended lock object API includes calls comprising:

a lock call including the lock object and the color attribute;

an unlock call including the lock object;

a cancel lock by color call including the lock object and a colors mask attribute; and a clear color mask call including the lock object.

2. The method of claim 1 further comprising:

upon determining the lock object is free and that the lock object can be presently completed, ignoring the color attribute in performing an operation on the lock object.

3. The method of claim 1 further comprising:

upon determining that the lock object is locked, queuing the calling thread in a waiting queue of the lock object along with the color attribute.

4. The method of claim 3 further comprising:

returning, via the extended lock object API, a lock acquired result if the lock object is acquired, or an aborted result if the calling thread in the waiting queue is cancelled by the cancel lock by color call.

5. The method of claim 4 wherein:

the cancel lock by color call prevents a new attempt to get the lock object having a color matching colors mask attribute to be rejected and returns an aborted result to the calling thread by the lock object; and wherein the cancel lock by color call results in a scanning of the waiting queue, and each entry in the waiting queue that has the color matching colors mask attribute is removed from the waiting queue and an aborted result is returned to the calling thread by the corresponding lock object.

6. The method of claim 1 wherein the clear color mask call clears a colors mask defined by a previously issued cancel lock by color call and allows standard operation of the lock object.

7. A system comprising:

a processor; and memory storing computer program code that when executed on the processor causes the processor to operate a storage system, the storage system operable to perform the operations of:

receiving a request for a lock object, the request received at a storage system from a calling thread, the request including a color attribute that indicates a type of flow associated with the calling thread;

passing the request with the color attribute to an extended lock object application programming interface (API) at the storage system; and performing, at the storage system, selective termination of requests that are waiting on the lock object, the selective termination based on the color attribute, and the requests including the request for the lock object;

wherein the extended lock object API includes calls comprising:

a lock call including the lock object and the color attribute;

an unlock call including the lock object;
a cancel lock by color call including the lock object and a colors mask attribute; and
a clear color mask call including the lock object attribute.

8. The system of claim 7, wherein the operations further comprise:
upon determining the lock object is free and that the lock object can be presently completed, ignoring the color attribute in performing an operation on the lock object.

9. The system of claim 7, further comprising:
upon determining that the lock object is locked, queuing the calling thread in a waiting queue of the lock object along with the color attribute.

10. The system of claim 9, further comprising:
returning, via the extended lock object API a lock acquired result if the lock object is acquired, or an aborted result if the calling thread in the waiting queue is cancelled by the cancel lock by color call.

11. The system of claim 10 wherein:
the cancel lock by color call prevents a new attempt to get the lock object having a color matching colors mask attribute to be rejected and returns an aborted result to the calling thread.

12. The system of claim 10, wherein the cancel lock by color call results in a scanning of the waiting queue, and each entry in the waiting queue that has the color matching colors mask attribute is removed from the waiting queue and an aborted result is returned to the calling thread.

13. The system of claim 7 wherein the clear color mask call clears a colors mask defined by a previously issued cancel lock by color call and allows a standard operation of the lock object.

14. A computer program product including a non-transitory computer readable storage medium having computer program code encoded thereon for allowing a flow specific policy of lock canceling that when executed on a processor of a computer causes the computer to operate a storage system, the computer program product comprising for performing operations, the operations comprising:
receiving a request for a lock object, the request received at a storage system from a calling thread, the request including a color attribute that indicates a type of flow associated with the calling thread;
passing the request with the color attribute to an extended lock object application programming interface (API) at the storage system; and
performing, at the storage system, selective termination of requests that are waiting on the lock object, the selective termination based on the color attribute, and the requests including the request for the lock object;
wherein the extended lock object API includes calls comprising:
a lock call including the lock object and the color attribute;
an unlock call including the lock object;
a cancel lock by color call including the lock object and a colors mask attribute; and
a clear color mask call including the lock object.

15. The computer program product of claim 14 wherein the operations further comprise:
upon determining the lock object is free and that the lock object can be presently completed, ignoring the color attribute in performing an operation on the lock object;
upon determining that the lock object is locked, queuing the calling thread in a waiting queue of the lock object along with the color attribute; and
returning, via the extended lock object API a lock acquired result if the lock object is acquired, or an aborted result if the calling thread in the waiting queue is cancelled by the cancel lock by color call.

16. The computer program product of claim 14, wherein:
the cancel lock by color call prevents a new attempt to get the lock object having a color matching colors mask attribute to be rejected and returns an aborted result to the calling thread by the corresponding lock object;
the cancel lock by color call results in a scanning of the waiting queue, and each entry in the waiting queue that has the color matching colors mask attribute is removed from the waiting queue and the corresponding lock object returns an aborted result; and
the clear color mask call clears a colors mask defined by a previously issued cancel lock by color call and allows a standard operation of the lock object.

* * * * *